Figure 1:
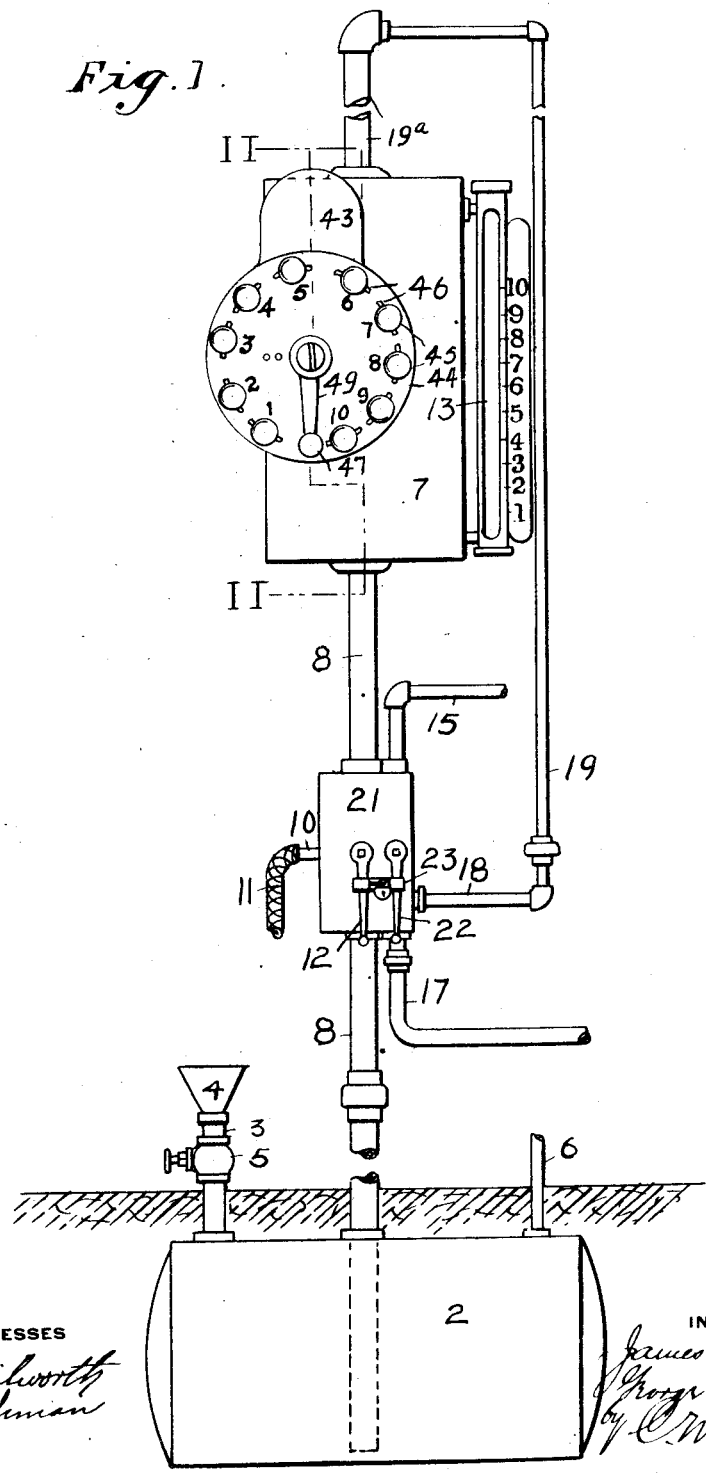

J. A. MacKENZIE & G. W. MacKENZIE, Jr.
LIQUID MEASURING APPARATUS.
APPLICATION FILED SEPT. 15, 1914.

1,179,857.

Patented Apr. 18, 1916.
3 SHEETS—SHEET 1.

J. A. MacKENZIE & G. W. MacKENZIE, Jr.
LIQUID MEASURING APPARATUS.
APPLICATION FILED SEPT. 15, 1914.
1,179,857.
Patented Apr. 18, 1916.
3 SHEETS—SHEET 2.
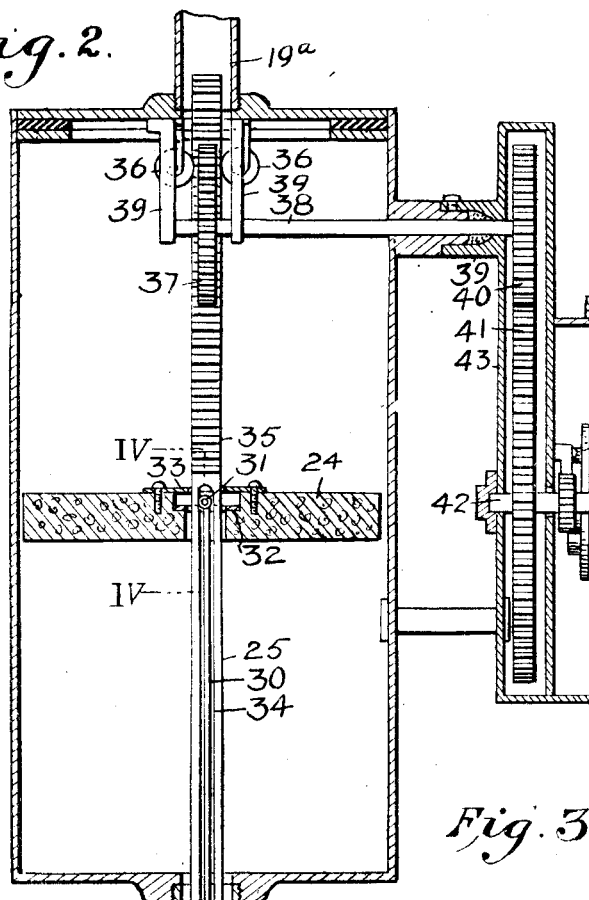
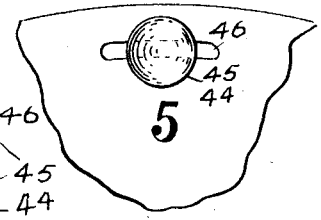
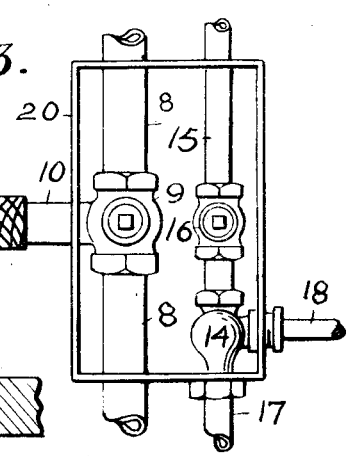
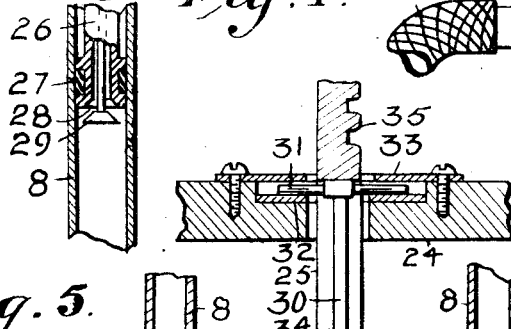
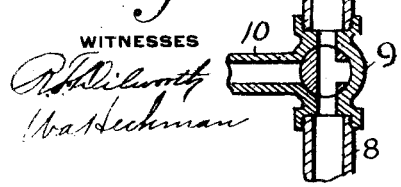
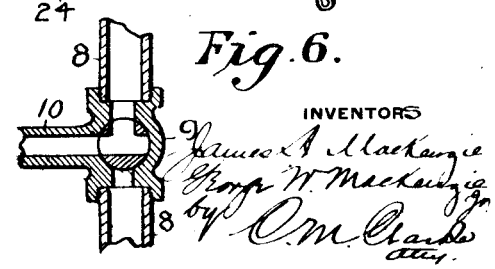

J. A. MacKENZIE & G. W. MacKENZIE, Jr.
LIQUID MEASURING APPARATUS.
APPLICATION FILED SEPT. 15, 1914.
1,179,857.
Patented Apr. 18, 1916.
3 SHEETS—SHEET 3.
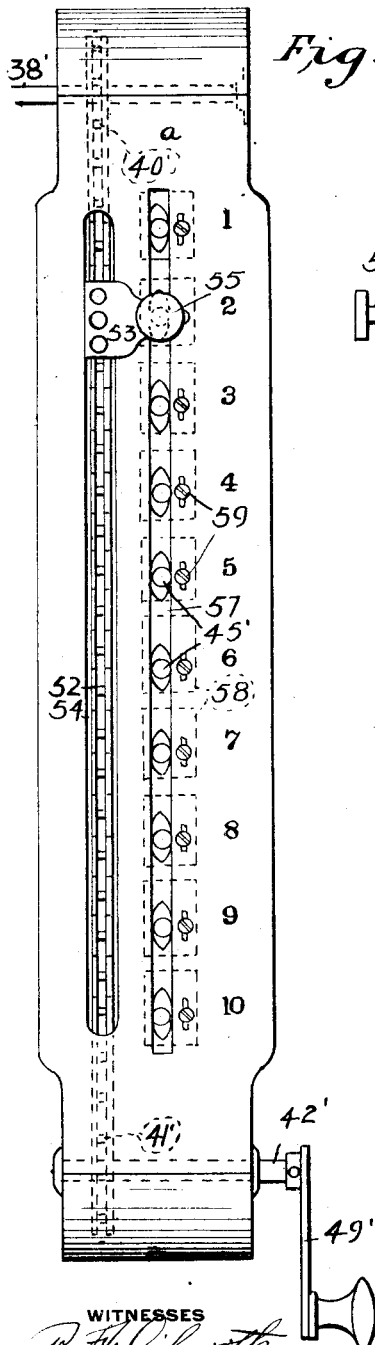
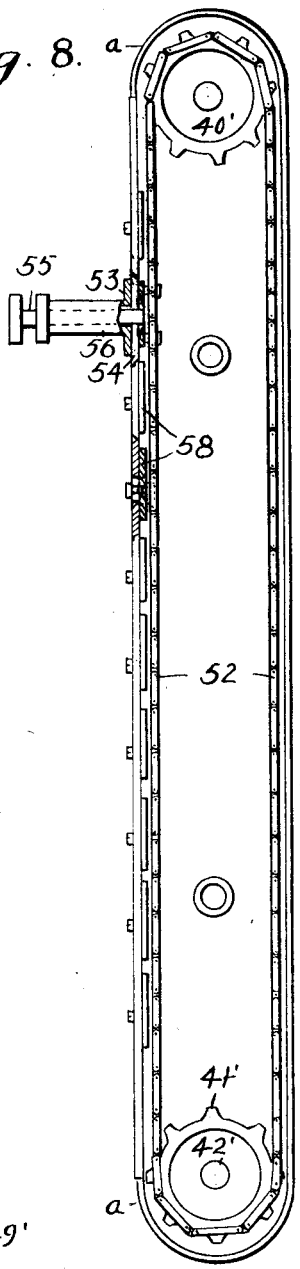
WITNESSES
INVENTORS

UNITED STATES PATENT OFFICE.

JAMES A. MacKENZIE AND GEORGE W. MacKENZIE, JR., OF BEN AVON, PENNSYLVANIA.

LIQUID-MEASURING APPARATUS.

1,179,857.         Specification of Letters Patent.     Patented Apr. 18, 1916.

Application filed September 15, 1914. Serial No. 861,775.

*To all whom it may concern:*

Be it known that we, JAMES A. MACKENZIE and GEORGE W. MACKENZIE, Jr., citizens of the United States residing at Ben Avon, in the county of Allegheny and State of Pennsylvania, have invented certain new and useful Improvements in Liquid-Measuring Apparatus, of which the following is a specification.

Our invention relates to improvements in means for delivering liquids, preferably in measured quantities, from a superimposed measuring or secondary tank connected with a main reservoir, provided with means for effecting the flow thereinto from the main reservoir, means for measuring the amount to be charged into the secondary tank, means for delivering the fluid from the temporary tank in such measured amounts, and various other features of improvement. as shall be more fully hereinafter set forth.

The invention, in general, is similar to that constituting the subject matter of another companion application filed Sept. 14, 1914, Serial No. 861,547.

In the drawings,—Figure 1 is a view of one form of the apparatus in elevation, partly broken away. Fig. 2 is a vertical sectional detail view, indicated by the line II—II of Fig. 1, through the secondary or measuring tank, and showing the actuating mechanism for the flow-controlling means. Fig. 3 is an enlarged detail view of the valve-controlled connections with the secondary tank for circulation of the fluids, as hereinafter described. Fig. 4 is an enlarged sectional detail view, showing the connection between the float and the flow-controlling valve stem. Figs. 5 and 6 are detail views, showing the three-way valve for the supply pipe to the secondary reservoir in different positions. Fig. 7 is a detail view of one of the adjustable measuring indicators. Fig. 8 is a face view of a modified arrangement of actuating gearing. Fig. 9 is an edge view, with the cover plate removed.

The apparatus is particularly designed for handling gasolene and the like, and to utilize a storage tank or reservoir 2 of well-known construction, preferably underground, and to withdraw a portion of the contents as required, through a secondary or measuring tank. The primary tank 2 is provided with any suitable filling pipe 3 having a funnel 4 and shut off cock or valve 5. A relief pipe 6 for admitting atmospheric air is connected with the upper portion of the tank 2 and may extend to any suitable point thereabove.

The secondary or measuring tank 7, which may be of any suitable construction, is located at any desired elevation above the primary tank for delivering through a pipe 8. Said pipe 8, as shown in Figs. 1 and 3, is continuous from tank 2 upwardly to the bottom of the tank 7 for direct upward flow of the liquid thereinto through three-way valve 9 having a lateral connection 10 for a delivery hose or other conduit 11. Three-way valve 9, when in the position shown in Fig. 5, is arranged for direct upward flow from main reservoir 2, by manipulation of a handle 12. When in the position shown in Fig. 6, it is arranged for flow of the liquid by gravity from tank 7 through lateral connection 10 and hose 11 to the point of consumption or use, as will be readily understood. Tank 7 is provided at one side with an indicating glass 13, whereby the height of the fluid may be seen, and suitable marks, as shown, showing the capacity, may be placed on the tank, or otherwise adjacent to the indicating gage, if desired, for showing the height of the liquid within tank 7.

For the purpose of eating a partial vacuum in tank 7, any suitable air-exhausting means may be employed, but we prefer to use a siphon or injector 14 of suitable construction connected with any source of fluid pressure, as by pipe 15 having a suitable controlling valve 16 connected to an ordinary water supply main or system, and having a waste pipe 17 leading to a sewer or suitable point of discharge. A suction pipe 18 is connected with the upper end of tank 7, preferably by an upper extension 19, which may, if desired, extend to a sufficient height to be beyond the range of the ultimate possible rise of the fluid upwardly above tank 7.

As shown, valves 9 and 16 are inclosed within a surrounding casing 20 provided with a removable front cover 21. The operating stems of valves 9 and 16 extend through said cover, and are provided with the operating handles 12 and 22 respectively, for control of the fluid to be measured in tank 7, and of the vacuum producing current respectively. Valve handles or arms 12 and 22 may be locked in inoperative position by means of a lock-controlled keeper or clamp 23, as indicated in Fig. 1.

From the foregoing description it will be seen that when air is exhausted from the interior of tank 7, liquid will rise from main reservoir 2 through pipe 8 and fill the tank 7 more or less.

For the purpose of providing means for controlling the filling of the secondary tank to any desired or predetermined capacity, we have provided the mechanism illustrated in detail in Fig. 2 of the drawings. A float 24 within the tank freely rises and falls therein upon the surface of the contained liquid. Float 24 is provided with a central opening through which passes the stem 25, which, by its lower portion 26, constitutes a tubular conduit for the liquid which passes upwardly into pipe 8. Conduit 26 is provided at its lower end with a suitable packing 27 and a valve seat 28 for a vertically movable valve 29. Said valve 29 is carried at the lower end of stem 30, which passes upwardly through conduit 26, and is connected with the float 24 at its upper end. Such connection is by any suitable means, as by a cross pin 31 bearing upon a supporting plate 32 surrounding the central opening in the float, and the pin is prevented against upward movement above the float by a housing plate 33. Conduit 26, as shown, is slotted at 34 longitudinally at each side, so that the conduit will thus deliver its contents upwardly into the interior of tank 7 at any position, at the same time providing clearance for pin 31 at varying positions. It will thus be seen that, conduit 26 being set at any particular position, its valve seat 28 will be located in a corresponding position upwardly above the valve 29, when float 24 is resting upon the bottom of the empty secondary tank 7. For the purpose of so locating the conduit 26 and valve seat 28 upwardly above valve 29, so that the rise of the float and valve will close further upward flow of the liquid into the tank at a predetermined point, means are provided for raising the conduit 26 to any desired position within the control and accurate limitation of the operator. For this purpose, conduit 26 extends upwardly through the float 24, as stated, and is provided thereabove with a series of rack teeth 35 adapted to extend upwardly through the air-exhausting pipe 19ᵃ, connected with suction pipe 19, as shown in Fig. 2. Rack 35 extends between any suitable guiding means, as rollers 36, and for the purpose of actuating the rack, we provide a pinion 37 on the inner end of shaft 38 carried in any suitable bearings 39. Shaft 38 extends outwardly through the front of the casing 7 and a packed bearing 39 thereon, and is provided at its outer end with a pinion 40. An actuating pinion 41 meshes thereinto, being carried on stem 42, within suitable bearings in a casing 43, carried outwardly in front of the measuring reservoir 7. By this construction, it will be seen that when shaft 42 is turned to a certain extent, shaft 38 will be also turned correspondingly, effecting a resulting travel of rack 35 and conduit 26, such movement being determined by the relations of the gearing and the movement of shaft 42.

In providing the apparatus for the purpose intended, it is designed that a certain predetermined movement of shaft 42 and resulting corresponding movement of the connected parts will correspond to a unit of measurement of the liquid, or any desired multiple thereof. For the purpose of definitely determining such unitary amount, the movement of shaft 42 is indicated visibly upon the front of the casing 7 by a dial 44 having secured around its periphery projecting buttons or abutments 45. These abutments are preferably made adjustable annularly, as by mounting them in slots 46 so as to definitely locate each abutment in the exact position for engagement with a limiting abutment on the shaft-actuating handle. Coöperating therewith is a pin 47 mounted within an extended casing 48 on handle 49 of shaft 42, whereby the inner end of stem 47, normally pressed inwardly by spring 50 will engage any particular abutment 45 when stem 47 is released by the operator to locate it, as stated. Stem 42 and casing 43 and its front plate 44 inclose suitable registering mechanism 51, whereby to indicate visibly through suitable openings in the front of dial plate 44 the number of units as successively measured. Inasmuch as such indicating mechanism is of well known construction and use, no detailed description of it is necessary.

The operation of the apparatus will be readily understood from the foregoing description.

Upon any desired amount of liquid being required, the crank handle 49 will be turned to the corresponding position as to engagement by its stem 47, for instance, with abutment 5, indicating five gallons. This operation will elevate the valve seat 28 to a position above the lowermost normal position of valve 29, as suspended from the float 24 when at its lowest position. The crank handle 12 of valve 9 is thrown to open position, as in Fig. 5, giving free circulation upwardly through conduit 8 from main reservoir 2. Valve handle 22 is then turned to open valve 16, admitting water supply to injector 14, effecting exhaust of air from the interior of casing 7, and a resulting upward flow of the liquid through conduit 8. Thereupon float 24 will be carried upwardly upon the surface of the liquid, carrying with it valve stem 30 and valve 29, until said valve seats against seat 28, arresting further upward flow into the supplemental tank 7, the amount therein corresponding to the desired amount of five gallons, as regulated by the capacity of the tank 7 and the degree of elevation of the conduit 26, as controlled by the gearing. Thereupon valve 9 being turned to the position shown in Fig. 6, the measured contents of tank 7 are delivered outwardly through lateral conduit 10 by gravity, emptying the tank. It will be understood also that when the tank is filled to the desired extent, the vacuum producing operation may be discontinued by closing valve 16 by its handle 22. If it is desired to empty tank 7 back into main reservoir 2, this may be readily accomplished by merely turning valve 9 to the position of Fig. 5. The tank 7 may also be emptied by slightly elevating conduit 26 until it effects unseating of valve 29 against seat 28, whereupon the contents will flow backwardly into the tank.

In Figs. 8 and 9 we have shown a modified actuating mechanism for the conduit 26 in which the pinion 37 is mounted upon the shaft 38' rotatably mounted in the upper end of a casing *a*, and carrying a sprocket wheel 40'. The lower end of the casing *a* is provided with a similar shaft 42' carrying the sprocket 41', said sprockets being connected by a continuous chain 52. Shaft 42' is provided with an operating handle 49' and a terminal button by which the sprocket gearing may be actuated, and chain 52 is provided with a fixedly attached stop 53. Said stop is connected with the chain through a vertical clearance slot 54, and is provided with an arresting stud 55 mounted in a suitable casing 56 of the stop 53.

Arranged vertically of the casing and parallel with the slot 54, is a guiding slot 57 traversed by the inner end of stem 55, and at predetermined intervals, corresponding to abutments 45, are a series of sockets 45', into which the inner end of stud 55 may be inserted, for fixedly holding the chain 52 and sprocket wheel 40' in the desired position. In this respect the degree of rotation of shaft 38' and the resulting elevation of the rack bar and the conduit 26 is accurately determined.

It will be understood that the several sockets 45' are spaced apart at predetermined locations, corresponding to the spaced locations of the abutments 45, and that each socket may be in the face of a plate 58 held by screw 59, by which means it may be accurately adjusted to the exact position desired.

In operation, the above construction is substantially similar to that heretofore described, the arrangement of the adjusting mechanism rendering it convenient for vertical movement instead of rotary.

The advantages of the invention will be readily appreciated by all those familiar with this class of mechanism. It presents to the purchaser a visible operation of measuring the exact amount of liquid, together with the delivery to him of the whole of the measured amount, in exactly measured quantities.

It will be understood that the particular manner of effecting a partial vacuum within the supplemental reservoir 7 is not restricted to the means shown and described, and that any other means may be utilized for the same purpose without in any way affecting the operation of the apparatus itself. Thus, liquid may be elevated into reservoir 7 by the use of pressure upon the contents of main reservoir 2, as by air pressure thereon, or the main reservoir may be located at a sufficient height above the reservoir 7 to effect its filling by gravity, without in any way impairing the efficiency of the apparatus itself.

It is reliable in its operation, comparatively simple and cheap in construction, very safe when used with combustible or explosive liquids, as gasolene, benzin, etc., and is capable of use with any other liquids, as oil, vinegar, etc.

It may be variously changed in design, proportions, detail arrangement, or otherwise by the skilled mechanic, but all such changes are to be considered as within the scope of the following claims.

What we claim is:

1. In combination, a main reservoir, a superimposed measuring tank, a pipe leading from the reservoir to the measuring tank, a float within the measuring tank, a vertically adjustable conduit extending from the measuring tank into the pipe leading from the reservoir provided with a terminal valve seat, and a valve therefor connected with the float.

2. In combination, a measuring tank, a conduit leading upwardly thereinto, a vertically adjustable stem extending into said conduit and provided with a valve seat, actuating means therefor, and a float within the tank having an attached valve operable upon said valve seat upon upward movement of the float.

3. In combination, a measuring tank, a float therein provided with a pendant valve, a supply conduit extending downwardly from the lower end of said tank, a vertically adjustable interior conduit telescoping therewith and provided with a valve seat, means for vertically adjusting and positioning said conduit and for holding it at predetermined positions, and coöperating indicating and limiting elements for said means.

4. In an apparatus of the class described, the combination with a measuring tank having an inlet and outlet conduit, a vertically adjustable conduit extending into the conduit and provided with a valve seat, and a float having a connected co-acting valve; of gearing having operative engagement with the vertically adjustable conduit.

5. In an apparatus of the class described, the combination with a measuring tank having an inlet and outlet conduit, a vertically adjustable conduit extending into the conduit and provided with a valve seat, and a float having a connected co-acting valve; of gearing having operative engagement with the vertically adjustable conduit, and co-operating indicating and movement-limiting devices incorporated with said gearing.

6. In an apparatus of the class described, the combination with a measuring tank having an inlet and outlet conduit, a vertically adjustable conduit extending into the conduit and provided with a valve seat, and a float having a connected co-acting valve; of gearing having operative engagement with the vertically adjustable conduit, said gearing adapted to actuate the vertically adjustable conduit, sprocket mechanism therefor embodying a driven and a driving sprocket wheel and a connecting chain, and a limiting arm attached to said chain.

7. In an apparatus of the class described, the combination with a measuring tank having an inlet and outlet conduit, a vertically adjustable conduit extending into the conduit and provided with a valve seat, and a float having a connected co-acting valve; of gearing having operative engagement with the vertically adjustable conduit, said gearing adapted to actuate the vertically adjustable conduit, sprocket mechanism therefor embodying a driven and a driving sprocket wheel and a connecting chain, a limiting arm attached to said chain, and a casing for said sprocket gearing provided with a series of limiting abutments coöperable with said arm.

8. In combination, a measuring tank, a supply conduit leading into the bottom thereof, a vertically adjustable conduit extending downwardly into the first named conduit and having a packing engagement therewith, said last named conduit opening at its upper portion into the tank and provided with a rack at the upper end, a pinion engaging said rack, means for actuating said pinion, a float in the tank carrying a stem, and a valve thereon adapted to close the conduit upon rise of the liquid to a predetermined height.

9. In combination, a measuring tank, a supply conduit leading into the bottom thereof, a vertically adjustable conduit extending downwardly into the first named conduit and having a packing engagement therewith and a terminal valve seat, said last named conduit opening at its upper portion into the tank and provided with a rack at the upper end, a pinion engaging said rack, and means for actuating said pinion and for accurately limiting the actuation thereof to locate said valve seat at predetermined heights, a float in the measuring tank carrying a stem extending downward through the inner conduit, and a valve on the lower end of said stem adapted to close the conduit upon rising thereto, substantially as described.

In testimony whereof we hereunto affix our signatures in the presence of two witnesses.

JAMES A. MacKENZIE.
GEORGE W. MacKENZIE, Jr.

Witnesses:
C. M. CLARKE,
FRED'K STAUB.